Patented Oct. 26, 1926.

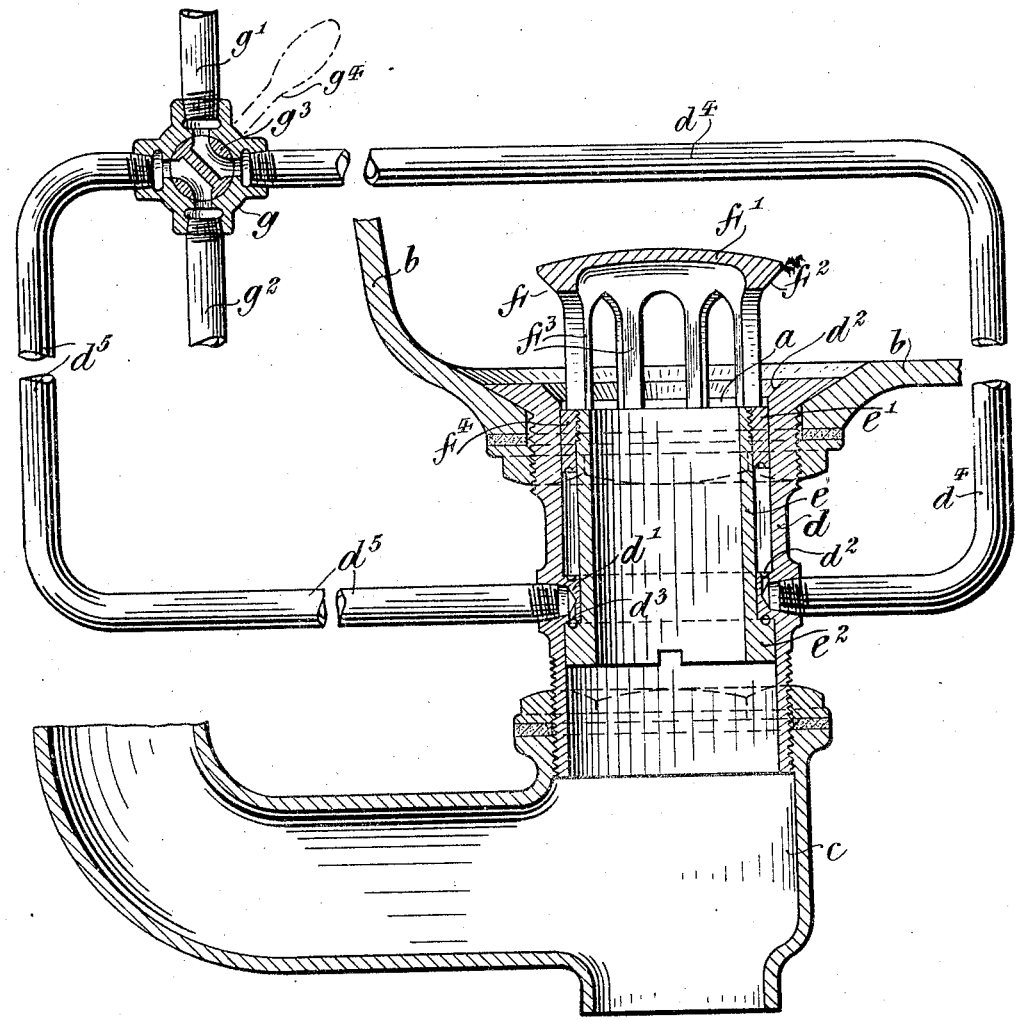

1,604,352

UNITED STATES PATENT OFFICE.

GEORGE HIRAM HENRIETTA, OF HARTFORD, CONNECTICUT, ASSIGNOR TO CURTIS HUSSEY VEEDER, OF HARTFORD, CONNECTICUT.

WASTE PLUG OR VALVE FOR BATHTUBS AND LAVATORIES.

Application filed April 15, 1926. Serial No. 102,148.

The most common form of waste plugs or valves is the rubber stopper at the end of a chain. In the better class of plumbing fixtures, such waste plugs or valves are hand-operated through the medium of concealed transmitting mechanism between a handle or knob and the plug or valve, such means generally involving features of construction which are open to some objections. The object of this invention is to provide for the operation of the valve by hydraulic pressure under the control of a simple valve which has no mechanical connection with the waste valve, the operating pressure being conveniently supplied from the water pipe which delivers water to the tub or lavatory.

The invention will be described more fully hereinafter with reference to the accompanying drawing, in the single figure of which, partly in vertical section and partly broken away to save space, is illustrated one convenient embodiment of the invention.

The outlet $a$ in the bottom of the tub or lavatory $b$ is shown as connected with the discharge pipe $c$ through a sleeve $d$, which is suitably connected in usual manner with the tub $b$, and with the discharge pipe $c$ and forms a cylinder for the movement of a hollow piston $e$ which carries the waste valve $f$. In this embodiment of the invention the waste valve is of the type known in the art as a "pop-up" valve, being raised above its seat to permit the discharge of water. It is therefore shown as comprising a head $f'$, formed as at $f^2$ for co-action with the seat $d^2$ formed in the upper end of the sleeve $d$ and supported by legs $f^3$ upon a ring $f^4$, by which it is connected to the hollow piston $e$. As shown, the sleeve $e$ which serves as the piston has for the intermediate portion of its length an external diameter less than the internal diameter of the sleeve $d$, fitting the inside of the sleeve $d$ with a good working fit at its upper end $e'$, and its lower end $e^2$. Provision is made for the admission and exhaust of water under pressure to the annular space between the sleeve $e$ and the sleeve $d$ so that pressure may be exerted upon the piston surfaces formed by the bands or rings $e'$ and $e^2$, the former being shown as threaded upon the sleeve $e$ and the latter as formed integral therewith. The sleeve $d$ is shown as formed interiorly with a band $d'$ which has a good working fit about the sleeve $e$, the band being formed at one point with a port and channel $d^2$ opening upward and at another point with a port and channel $d^3$ opening downward, the band $d'$ and the bands or rings $e'$ and $e^2$ being preferably grooved in their proximate surfaces to facilitate the admission of water under pressure to one side or the other of the band $d'$.

Provision is also made for connection of the ports $d^2$ and $d^3$ with the water pipe system, through suitable pipes $d^4$ and $d^5$ and a four-way valve $g$, which is located conveniently for operation and is connected also on one side with the water supply, as by a pipe $g'$, and on the other side with the discharge, as by a pipe $g^2$. The valve plug $g^3$ is provided with a suitable handle $g^4$ so that it may be shifted at will to admit water under pressure to one side or the other of the cylinder ring or band $d'$, the space at the other side of the cylinder band or ring $d'$ being at the same time connected with the exhaust or discharge pipe $g^2$. In the position of the parts shown in the drawing, water has been admitted through the pipe $d^4$ to the port and channel $d^2$ so that pressure has been exerted against the under side of the piston ring or band $f^4$ to lift the waste valve $f$ to its open or discharge position, the space at the other or under side of the cylinder ring or band $d'$ being connected at the same time, through the pipe $d^5$, with the exhaust or discharge $g^2$ to permit the escape of water from the annular space on the under side of the cylinder band or ring $d'$ during the opening movement of the valve. When the valve $g$ is shifted to its other position, the water under pressure will be admitted at the lower side of the cylinder band or ring $d'$ and will effect closing movement of the valve $f$, the space at the upper side being at the same time connected with the exhaust or discharge. It will be understood that the valve $g$ may be left in either position, retaining the valve $f$ in the corresponding position, and that there will be no loss of water except such negligible loss as there may be by leakage.

It will be understood that various changes in details of construction and arrangement can be made to suit different conditions of use and that, except as pointed out in the claims, the invention is not limited to the particular construction shown and described herein.

I claim as my invention:

1. In a waste valve, the combination of a cylinder sleeve having an internal band provided with channels and ports opening to opposite sides thereof, a piston sleeve movable in the cylinder sleeve and having opposite piston surfaces, a valve head carried by the piston sleeve, and connections from the cylinder sleeve at opposite sides of the cylinder ring to a source of fluid under pressure.

2. In a waste valve, the combination of a cylinder sleeve having an internal band provided with channels and ports opening to opposite sides thereof, a piston sleeve movable in the cylinder sleeve and having opposite piston surfaces, a valve head carried by the piston sleeve, connections from the cylinder sleeve on opposite sides of the cylinder ring to a source of fluid under pressure, and a valve to control the admission of fluid under pressure to one side or the other of the cylinder ring and the discharge of fluid from the other side.

This specification signed this 13th day of April A. D. 1926.

GEORGE HIRAM HENRIETTA.